United States Patent [19]

Avery

[11] 4,097,896
[45] Jun. 27, 1978

[54] SYNC SEPARATOR CIRCUIT

[75] Inventor: Leslie Ronald Avery, Surrey, England

[73] Assignee: RCA Corporation, New York, N.Y.

[21] Appl. No.: 774,213

[22] Filed: Mar. 3, 1977

[30] Foreign Application Priority Data

Feb. 23, 1977 United Kingdom ............... 12535/77

[51] Int. Cl.² .............................................. H04N 5/08
[52] U.S. Cl. ................................................... 358/153
[58] Field of Search ................................. 358/153, 155

[56] References Cited

U.S. PATENT DOCUMENTS 3,869,568  3/1975  Ueda et al. ........................... 358/153

Primary Examiner—Robert L. Richardson
Attorney, Agent, or Firm—Eugene M. Whitacre; Paul J. Rasmussen; Joseph Laks

[57] ABSTRACT

A constant current source supplies a bias current through a diode chain, establishing a first voltage at a terminal coupled to the string. A DC restorer circuit, responsive to a source of composite video signals, couples an additional current through the diode chain during the sync interval. This additional current establishes a second voltage level at the terminal. The second voltage is compared with a reference voltage for producing output signals synchronized with the sync pulses.

18 Claims, 6 Drawing Figures

SYNC SEPARATOR CIRCUIT

BACKGROUND OF THE INVENTION

This invention relates to sync separator circuits.

Composite video signals obtained from the IF stages of a television receiver are composed of two parts, a video portion which contains picture information to be coupled to the electron guns of the cathode ray tube, and a sync portion having sync pulses superimposed upon a blanking level. A sync separator circuit clips the sync pulses from the video signal portion. The sync pulses are then used to synchronize horizontal and vertical scanning with the incoming video information.

Certain television transmitting systems, such as community antenna television systems (CATV) which include amplifiers and/or remodulators, place increasing demands on the sync separator. Because such amplifier systems tend to compress the sync pulses, the sync separator must be able to operate properly with only a fraction of the normal sync pulse amplitude.

If adequate composite video amplitude is available, typical conventional sync separators can operate properly with 25% of the normal sync amplitude. However, with modern integrated circuits, the composite video available is often only 2-3 volts. The sync separator must be able to operate with sync pulse amplitudes of 200 millivolts or less. It is, therefore, desirable to provide a sync separator that can be incorporated as part of an integrated circuit and can operate with relatively low relative and absolute sync pulse amplitudes.

SUMMARY OF THE INVENTION

A first circuit provides a bias current through a plurality of series coupled diodes and establishes a first voltage at a terminal coupled to the diodes. A second circuit, responsive to a source of video signals, the video signals including synchronizing signals, introduces to the plurality of series coupled diodes during the occurrence of the synchronizing signals a current in addition to the bias current for establishing a second voltage at the terminal. A third circuit develops an output signal when the second voltage and a reference voltage differ by a predetermined value.

DESCRIPTION OF THE INVENTION

Figure 1:
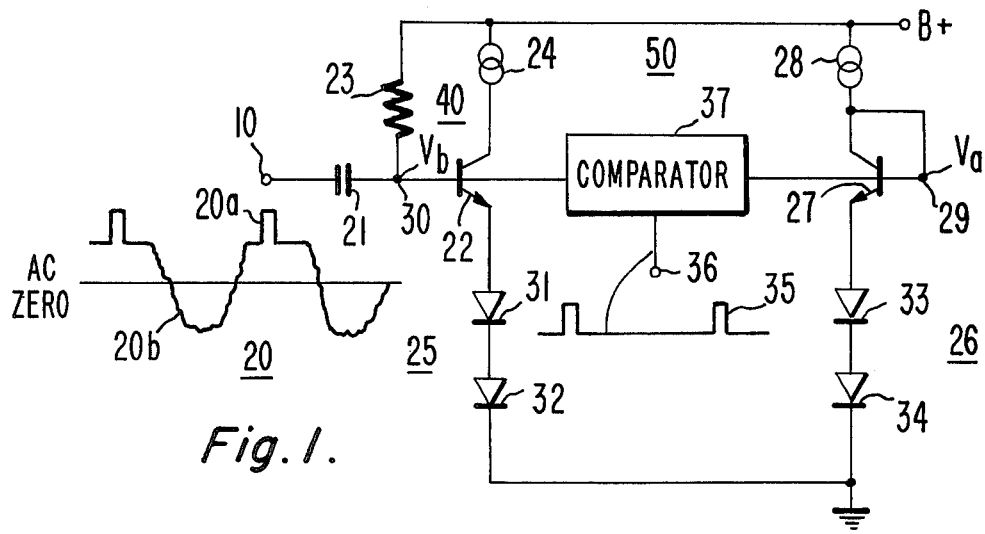
FIG. 1 is a schematic circuit of an embodiment of the invention.

In FIG. 1, AC signals comprising composite video signals 20, obtained from conventional IF stages of a television receiver, are coupled to a terminal 10 of a sync separator circuit 50. The signals are then coupled through a capacitor 21 to a first input terminal 30 at the base of a transistor 22. A resistor 23 couples the base of transistor 22 to a source of B+ voltage. The collector of transistor 22 is coupled to a constant current source 24. The emitter is coupled to ground through a pair of diodes 31 and 32, forming a first diode chain 25 comprising diodes 31 and 32 and the base-emitter junction of transistor 22.

Capacitor 21, resistor 23 and transistor 22 form a DC restorer circuit 40 to provide a DC restoration voltage to the video sync portion 20a of the AC composite video signals 20. During the sync interval, transistor 22 is forward biased into saturation by the sync pulses 20a of composite video signals 20, and a DC restoration voltage equal to the difference between the DC voltage at terminal 30 and the effective DC appearing at terminal 10 during the sync period is developed across the capacitor. The resistor 23 provides current to charge capacitor 21 during the video picture interval to replace charge removed during the sync interval.

When transistor 22 conducts during the sync interval, current flows through diode chain 25. A major portion of this current comprises a biasing current originating from constant current source 24. This biasing current establishes a reference potential at terminal 30. Capacitor 21 of the DC restorer circuit 40 then provides the remaining additional current through diode chain 40. The additional current increases the voltage at terminal 30 by an incremental amount, providing a voltage level $V_b$ at terminal 30 during the sync interval.

Coupled between the B+ voltage source and ground are a constant current source 28, a transistor 27, and a pair of diodes 33 and 34. The collector and base of transistor 27 are coupled together forming a diode structure. A second diode chain 26 comprises diodes 33 and 34 and the base-emitter junction of transistor 27. Diode chains 25 and 26 are illustratively constructed from identical npn transistors, and for identical constant current sources 24 and 28, the voltage at a second input terminal 29 coupled to the base of transistor 27 is equal to a reference voltage $V_a$.

Input terminals 29 and 30 are coupled to a voltage comparator 37. During the picture interval, the negative-going video signals 20b reverse bias transistor 22, and the voltage at input terminal 30 of comparator 37 is lower than the voltage at input terminal 29. The voltage at an output terminal 36 is at a first output voltage level. During the sync interval, because of the additional current from capacitor 21, the voltage at terminal 30 is at a value $V_b$ which is greater than the voltage $V_a$ at terminal 29. The voltage at output terminal 36 of comparator 37 then shifts to a second output voltage level, thereby providing repetitive output signals 35 in synchronization with the incoming sync pulses 20a. The output signals 35 are coupled to horizontal and vertical deflection circuits, not shown, for obtaining synchronized deflection scanning.

Figure 4A:
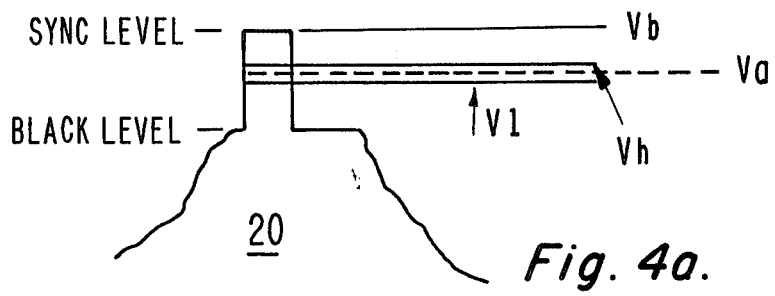
FIGS. 4a – 4c illustrate waveforms associated with the circuits of FIGS. 1 – 3.

Comparator 37, depending upon its gain, will require a certain voltage change to shift completely from one output voltage level to another. As illustrated in FIG. 4a, at the start of the sync pulse, the voltage increases from black level towards sync level at a rate limited by the system bandwidth and any noise filtering, not shown, included between the video section and the input to the sync separator. When the input voltage $V_b$ at terminal 30 is equal to the lower threshold level $V_l$ of comparator 37, the waveform 35 at output terminal 36 begins to move from the low state to the high state. When the input voltage $V_b$ is equal to $V_a$, comparator 37 is in the balanced state, and the output voltage at terminal 36 is half-way between the low and high levels. When the input voltage $V_b$ exceeds the upper threshold level $V_h$ of comparator 37, the voltage at output terminal 36 is in the high state. No further change now takes place in the voltage at terminal 36 until the negative-going edge of the sync pulse when the reverse of the above occurs.

The switching thresholds $V_l$ and $V_h$ of comparator 37 can be made to approach $V_a$ by increasing the gain of comparator 37. In practice, $V_l$ and $V_h$ will differ by less than 5 millivolts.

Figure 4B:
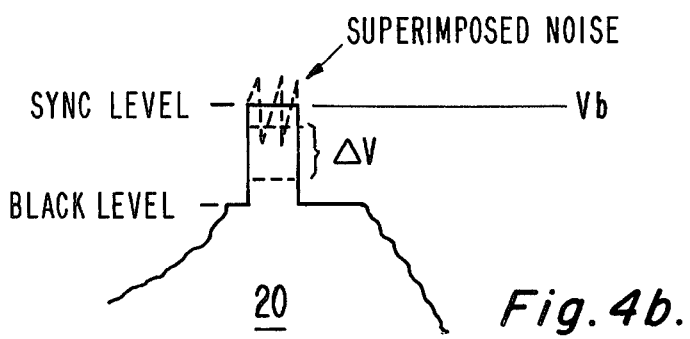
Figure 4C:
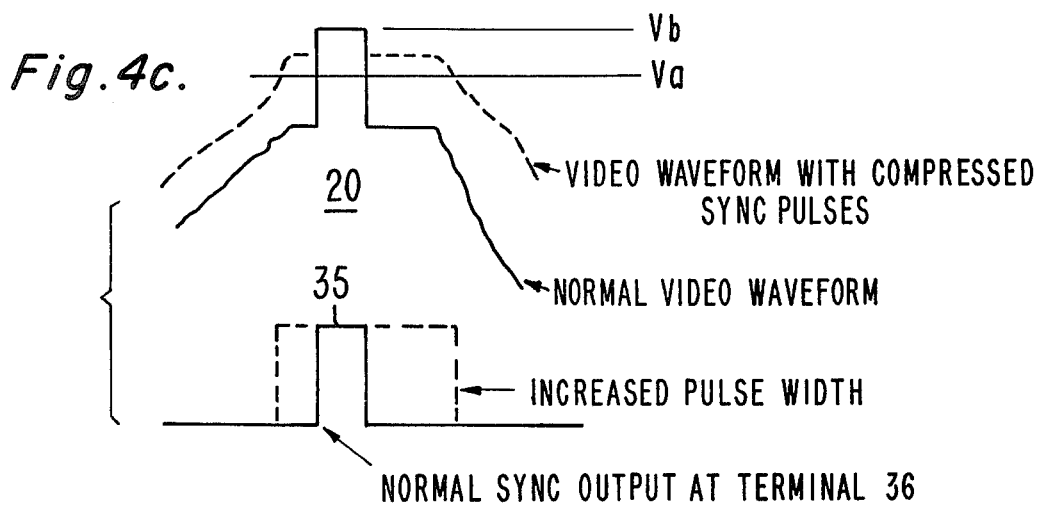

The circuit of FIG. 1 can readily be fabricated as an integrated circuit, and comparator reference level $V_a$ may be varied, as illustrated in FIG. 4b, over a wide range $\Delta V$ by such conventional techniques as geometrical device ratioing or by including a small resistor in diode chain 25. If the reference level $V_a$ is placed too close to the sync level then the circuit will be sensitive to noise pulses superimposed on the sync level. By setting the reference level $V_a$ closer to the black level, improved noise immunity results, but in the presence of small amplitude sync pulses, such as would result from weak signals or some remodulated cable distribution systems, the sync separator would actually be operating on video, as illustrated in FIG. 4c. A compromise in the voltage level of $V_a$ with respect to DC restoring level $V_b$ has to be established to provide correct operation of the circuit in the presence of composite video waveforms with compressed syncs and normal composite video waveforms having a high noise content.

Figure 2:
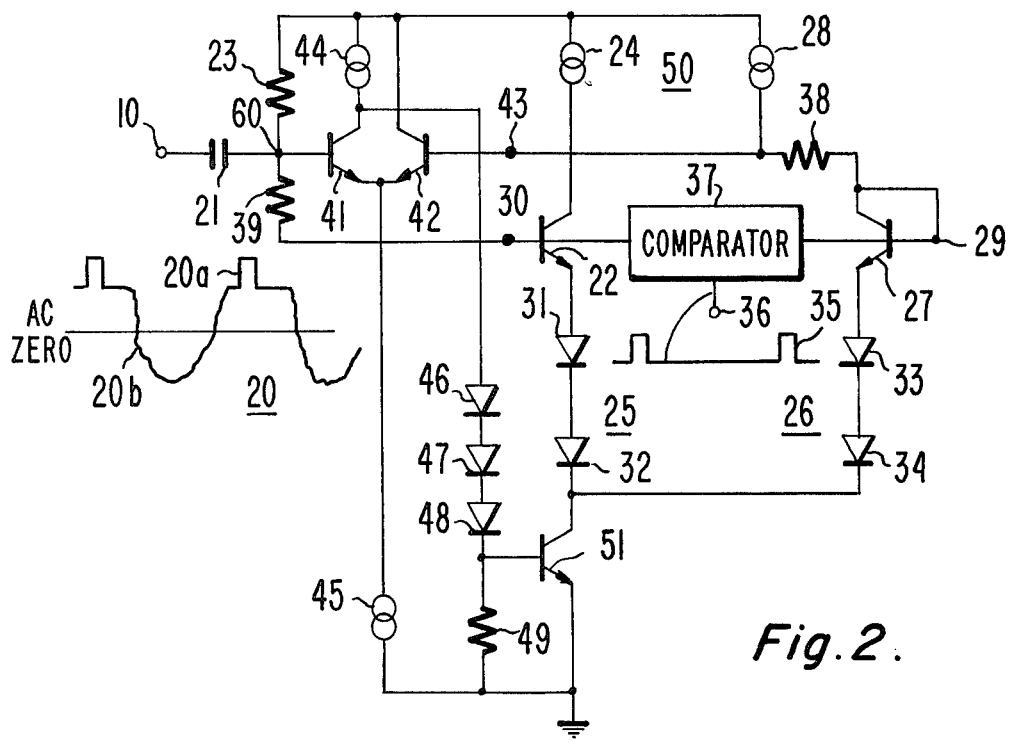
FIG. 2 is a schematic circuit of another embodiment of the invention.

The circuit of FIG. 2 is another embodiment of a sync separator circuit and includes a noise elimination circuit. Circuit elements of FIG. 2 corresponding to those of FIG. 1 are identically marked. Capacitor 21 is now coupled to input terminal 30 at the base of transistor 22 through a resistor 39, and the collector of transistor 27 is coupled to constant current source 28 through a resistor 38. The junction of resistors 23 and 39 is coupled to a first differential amplifier input terminal 60 of a differential amplifying pair of transistors 41 and 42. A second input terminal 43 is coupled to resistor 38. Constant current sources 44 and 45 are coupled, respectively, to the collector of transistor 41 and the emitters of transistors 41 and 42. Constant current source 44 is coupled to ground through serially coupled diodes 46–48 and a resistor 49. A transistor 51 has its collector coupled to the cathodes of diodes 32 and 34, its base coupled to resistor 49, and its emitter coupled to ground.

In the absence of noise, when sync pulses 20a bias transistor 22 into conduction, the voltage drop across resistor 39 establishes a certain reference voltage at differential amplifier input terminal 60. The voltage drop across resistor 38 is selected to be larger than that across resistor 39. Transistor 42 will conduct, and transistor 41 will be cut off. Current from source 44 will flow through elements 46–49, causing transistor 51 to saturate.

In the presence of noise which exceeds the normal sync pulse height, a higher than normal current flows through resistor 39, and the added voltage drop, due to the noise, turns transistor 41 on, thereby sinking the current from source 44 away from elements 46–49. In this condition, transistor 51 cuts off, cutting off transistor 22 and disabling operation of sync separator 50. The current flow through resistor 39 from capacitor 21 is reduced to a value which will just maintain transistor 41 conducting. The discharge rate of capacitor 21 is greatly reduced, thus ensuring a rapid recovery time of sync separator circuit 50 after the noise interference has ceased.

Figure 3:
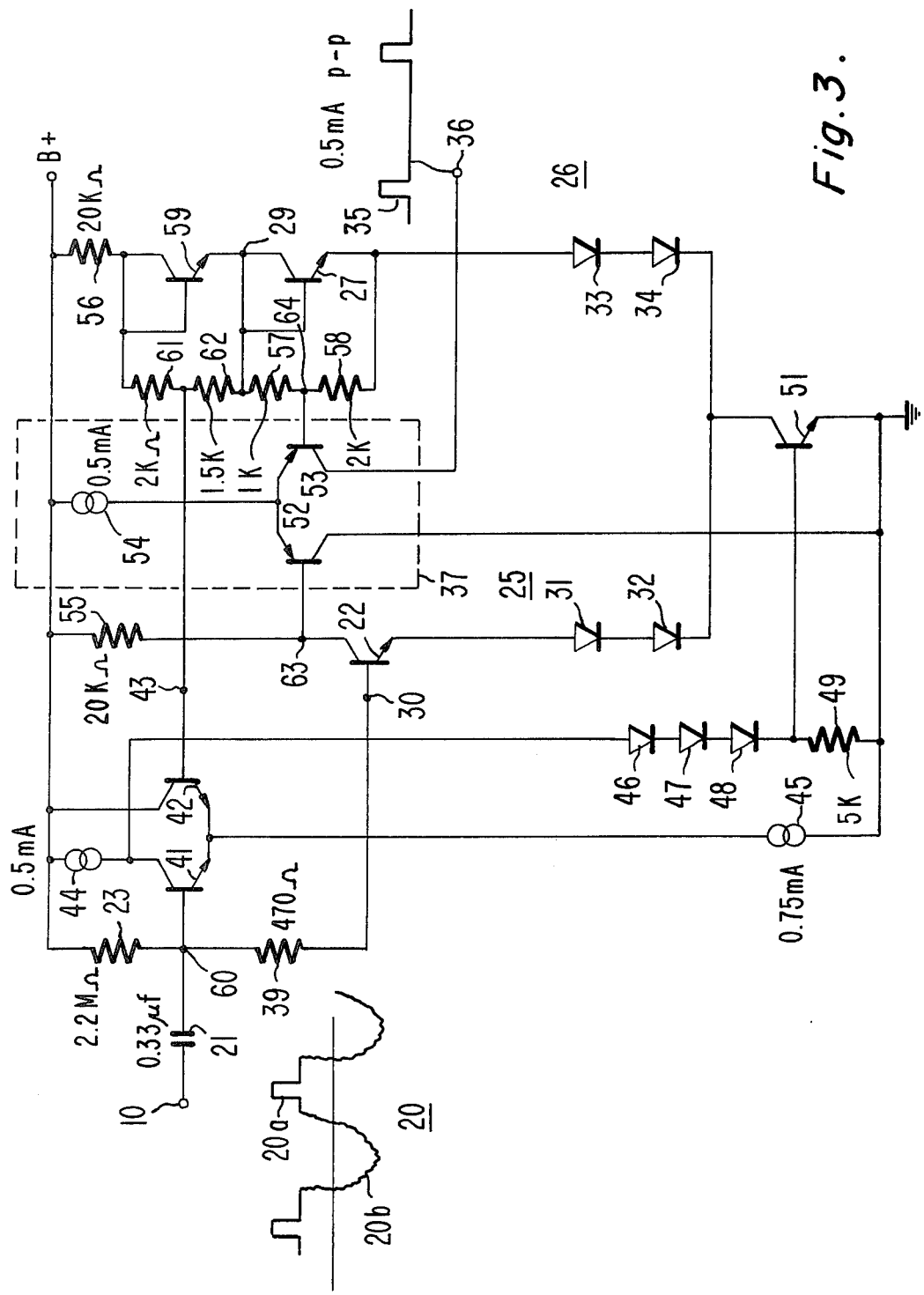
FIG. 3 is a schematic circuit of still another embodiment of the invention.

A modification of the circuit of FIG. 2 is illustrated in FIG. 3. Comparator 37 comprises a pair of differentially coupled transistors 52 and 53 and a constant current source 54; output terminal 36 is coupled to the collector of transistor 53. Constant current sources 24 and 28 of FIG. 2 are replaced, respectively, by resistors 55 and 56. The reference voltage at an input terminal 64 is obtained from a voltage divider across transistor 27 at the junction of a resistor 57 and a resistor 58.

The amplification capability of transistor 22 can be used to advantage by coupling an input terminal 63 to the collector of transistor 22. Because, in saturation, the collector voltage of transistor 22 approaches the emitter voltage, the clipping point for sync pulses 20a can be accurately determined.

The noise threshold level is determined by use of a voltage divider comprising resistors 61 and 62 coupled across a diode coupled transistor 59 in series with transistor 27. Such an arrangement results in the noise threshold level remaining virtually constant over a wide range of supply voltages.

With the component values of FIG. 3, as indicated, and with a nominal 3 volt peak-to-peak composite video signal 20, correct sync separator operation was obtained with as little as 15% relative sync pulse amplitude (approximately 150 millivolts), while maintaining full noise immunity performance.

What is claimed is:

1. A sync separator circuit, comprising:
   a source of video signals, said video signals including synchronizing signals;
   a first plurality of series coupled diodes;
   controllable switching means coupled to said first plurality;
   a source of first bias current coupled to a control terminal of said controllable switching means;
   first means coupled to one of said first plurality and said controllable switching means for providing a first current through said first plurality of series coupled diodes, said first current establishing a first voltage at a first terminal coupled to said first plurality of series coupled diodes during the occurrence of said synchronizing signals;
   second means coupled to said control terminal and responsive to said source of video signals for providing during the occurrence of said synchronizing signals an additional bias current to said controllable switching means for introducing to said first plurality of series coupled diodes during said occurrence a second current in addition to said first current for establishing a second voltage at said first terminal;
   a source of first reference voltage; and
   comparator means responsive to said first reference voltage and said second voltage for developing an output signal when said second voltage and said first reference voltage differ by a predetermined value.

2. A circuit according to claim 1, wherein said source of first reference voltage comprises a second plurality of series coupled diodes through which a third current flows.

3. A circuit according to claim 1, wherein said second means comprises a DC restorer circuit for providing said additional bias current.

4. A circuit according to claim 3, wherein said DC restorer circuit includes a capacitor coupled to said controllable switching means, said controllable switching means conducting in a saturated state during the occurrence of said synchronizing signals.

5. A circuit according to claim 4, wherein said controllable switching means comprises a first transistor, said first bias current and said additional bias current coupled to a base-emitter junction of said first transistor.

6. A circuit according to claim 5, wherein said first terminal is coupled to the collector of said first transistor.

7. A circuit according to claim 5, wherein said source of first reference voltage comprises a second plurality of series coupled diodes through which a third current flows.

8. A circuit according to claim 1, including noise elimination means comprising third means coupled to said series coupled diodes for generating at a terminal coupled to said third means a third voltage during the occurrence of said synchronizing signals, means for generating a noise reference voltage and disabling means responsive to said third voltage and said noise reference voltage for disabling operation of said sync separator circuit when said third voltage and said noise reference voltage differ by a predetermined value.

9. A circuit according to claim 8, wherein said third means comprises a resistor through which said additional bias current flows.

10. A circuit according to claim 8, wherein said disabling means includes switching means coupled to said first plurality of series coupled diodes, and fourth means coupled to said switching means for changing the conduction of said switching means when said third voltage and said noise reference voltage differ by a predetermined value.

11. A circuit according to claim 9, wherein said fourth means comprises a differential amplifier including second and third differentially coupled transistors, said third voltage and said noise reference voltage coupled, respectively, to first and second input terminals of said differential amplifier.

12. A circuit according to claim 8, wherein said source of first reference voltage comprises a second plurality of series coupled diodes through which a third current flows.

13. A circuit according to claim 12, wherein said means for generating a noise reference voltage comprises a first diode coupled in series with said second plurality of series coupled diodes and a voltage divider network coupled across said first diode, said noise reference voltage obtained at a junction point within said voltage divider network.

14. A sync separator circuit, comprising:
 a DC restorer circuit responsive to a source of composite video signals, said DC restorer circuit including a controlled semiconductor means;
 a first impedance coupled to said controlled semiconductor means;
 biasing means coupled to a control terminal of said controlled semiconductor means for providing a bias current to said controlled semiconductor means, said DC restorer circuit providing an additional current to said control terminal during the occurrence of synchronizing signals within said composite video signals for biasing said controlled semiconductor means into conduction for establishing during said occurrence a first voltage representative of said additional current at a first terminal coupled to said first impedance;
 a source of reference voltage; and
 comparator means responsive to said reference voltage and said first voltage for developing an output signal when said first voltage and said reference voltage differ by a predetermined value.

15. A circuit according to claim 14, wherein said DC restorer circuit includes a capacitor for charging to a peak value of said synchronizing signals and a discharging impedance coupled to said capacitor.

16. A circuit according to claim 15, wherein said controlled semiconductor means comprises a transistor, said biasing means comprising a bias voltage coupled to said discharge impedance, said discharge impedance being coupled to a base-emitter junction of said transistor.

17. A circuit according to claim 14, including noise elimination means comprising a second terminal coupled to said impedance, a noise component of said additional current establishing a second voltage at said second terminal, and means for disabling operation of said sync separator when said second voltage differs from a noise reference voltage by predetermined values.

18. A sync separator with noise elimination comprising:
 an input terminal for coupling thereto a composite video signal;
 a DC restorer coupled to said input terminal for developing a DC restoration voltage during a sync interval, said DC restorer including a controlled semiconductor;
 biasing means coupled to a control terminal of said controlled semiconductor for providing a bias voltage to said controlled semiconductor;
 an impedance coupled to said DC restorer, said DC restoration voltage providing an additional bias voltage to said control terminal for generating a first current through said impedance during said sync interval;
 a current source coupled to said DC restorer for generating a second current through said impedance during said sync interval, said first and second currents combined developing a first voltage at a first terminal coupled to said impedance;
 first comparator means with a first comparator input terminal coupled to said first terminal and a second comparator input terminal suitable for coupling to a source of reference voltage for developing a sync signal when said first voltage and said reference voltage differ by a predetermined amount;
 a second terminal coupled to said impedance; and
 a second comparator coupled to said second terminal, the magnitude of said DC restoration voltage changing under predetermined noise conditions for changing the voltage at said second terminal for generating at an output terminal of said second comparator a disabling signal for said sync separator.

* * * * *